United States Patent
Akashi et al.

(10) Patent No.: US 7,424,183 B2
(45) Date of Patent: Sep. 9, 2008

(54) COLLIMATOR ARRAY AND METHOD FOR MANUFACTURING THE SAME

(75) Inventors: Tamotsu Akashi, Kawasaki (JP); Tsuyoshi Yamamoto, Kawasaki (JP); Shinji Yamashita, Kawasaki (JP); Kohei Shibata, Kawasaki (JP); Hirofumi Aota, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 537 days.

(21) Appl. No.: 11/041,435

(22) Filed: Jan. 25, 2005

(65) Prior Publication Data

US 2006/0093263 A1    May 4, 2006

(30) Foreign Application Priority Data

Oct. 29, 2004    (JP)    ............................. 2004-315746

(51) Int. Cl.
    *G02B 6/32*    (2006.01)
(52) U.S. Cl. ........................................................ 385/33
(58) Field of Classification Search .............. 385/33–35
    See application file for complete search history.

(56) References Cited

U.S. PATENT DOCUMENTS

| 6,587,618 | B2 | 7/2003 | Raguin et al. .................. 385/33 |
| 6,643,068 | B2 | 11/2003 | Mandella ..................... 359/628 |
| 2003/0219213 | A1* | 11/2003 | Blarasin et al. ................ 385/52 |
| 2004/0213526 | A1* | 10/2004 | Inoue et al. .................... 385/96 |

OTHER PUBLICATIONS

Akio. Tanabe, et al., "Development of Direct Core Monitoring Fusion Splicer S175", Furukawa Denko Technical Review, vol. 104, Jul. 1999.

* cited by examiner

*Primary Examiner*—Sarah Song
(74) *Attorney, Agent, or Firm*—Staas & Halsey LLP

(57) ABSTRACT

A collimator array includes a substrate; a plurality of lenses formed on one face of the substrate; and a plurality of projecting parts, each of which is formed on a portion corresponding to the lens on the other face of the substrate, respectively and is fusion-connected to an optical fiber, respectively; wherein an area of the fusion-connected face of the projecting part with respect to the optical fiber is set to be larger than a cross sectional area of the optical fiber. Thereby, it is possible to provide a collimator having fewer variations in an output beam angle and a diameter of an output beam and having excellent strength, and a method for manufacturing the same.

22 Claims, 18 Drawing Sheets

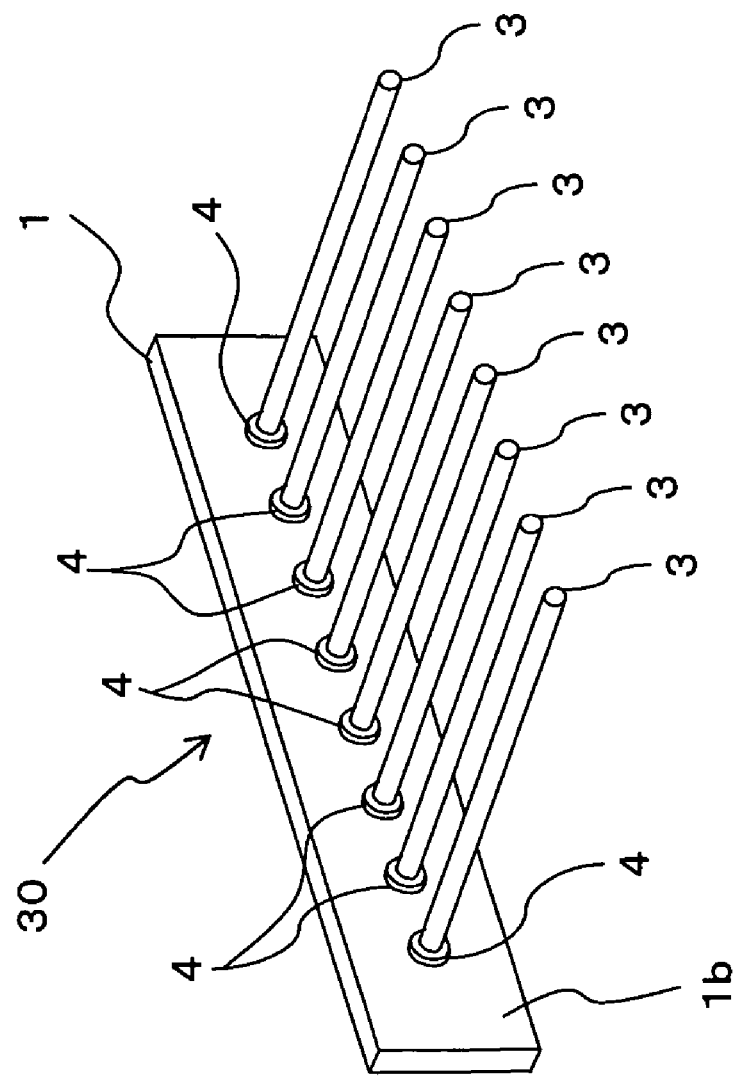

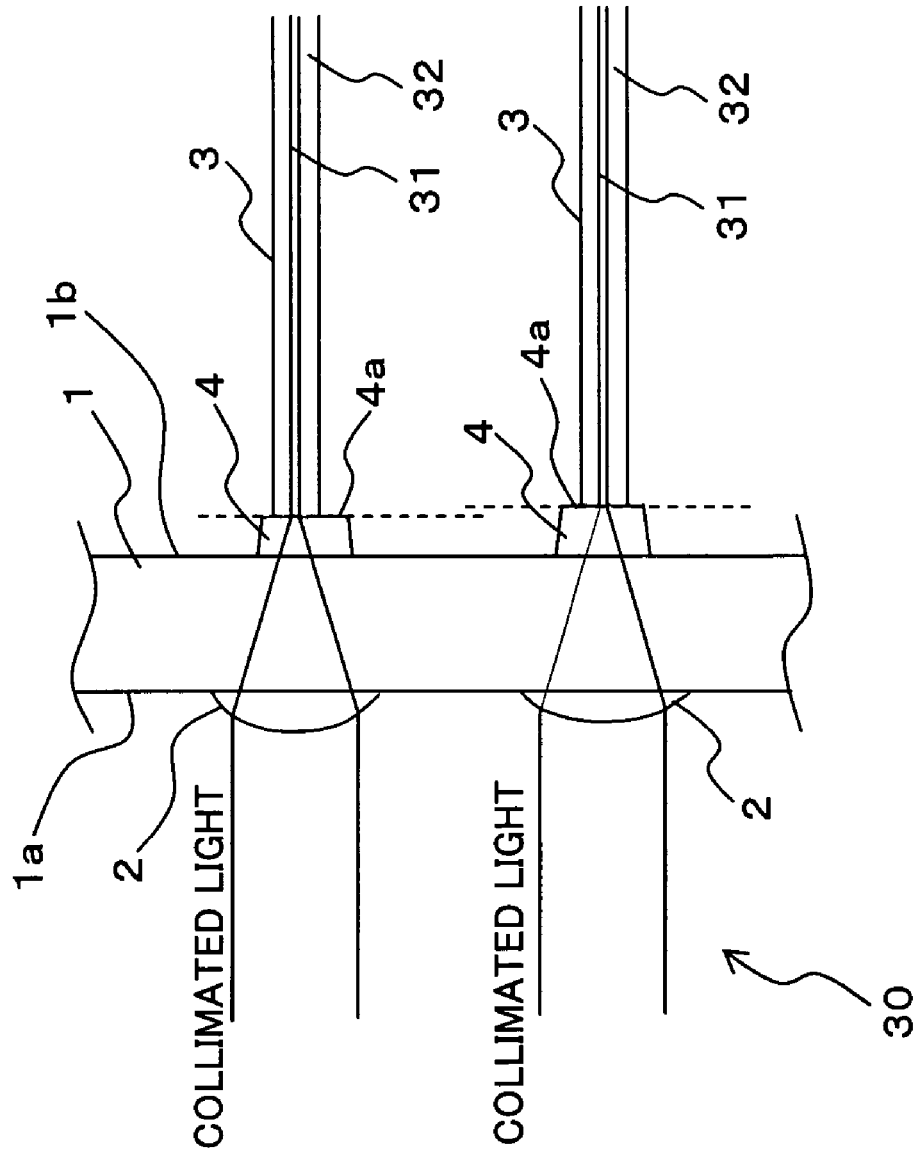

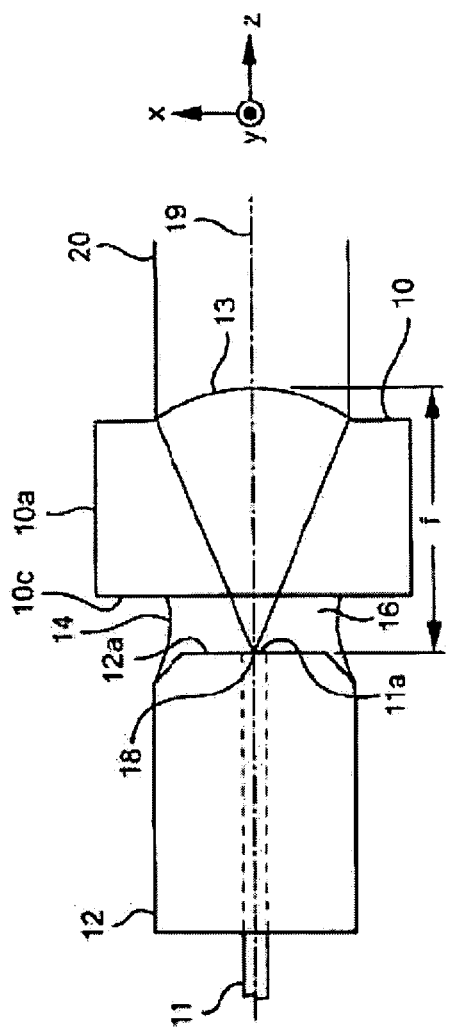
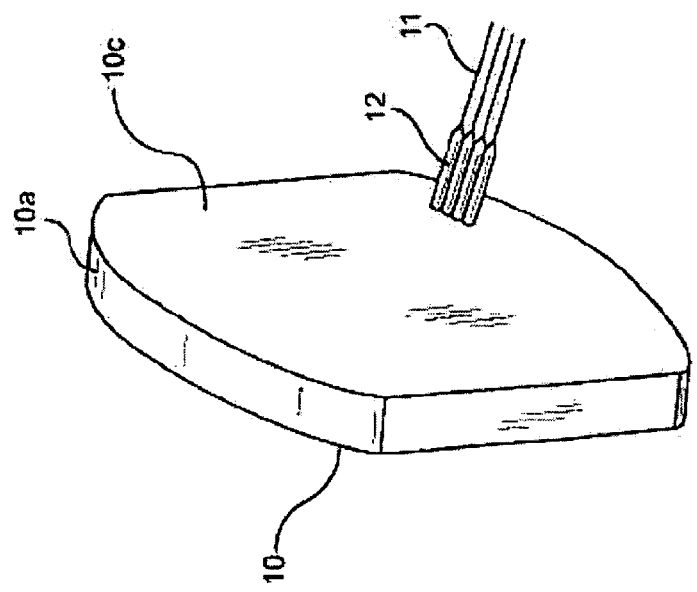
FIG. 15(A) PRIOR ART
FIG. 15(B) PRIOR ART

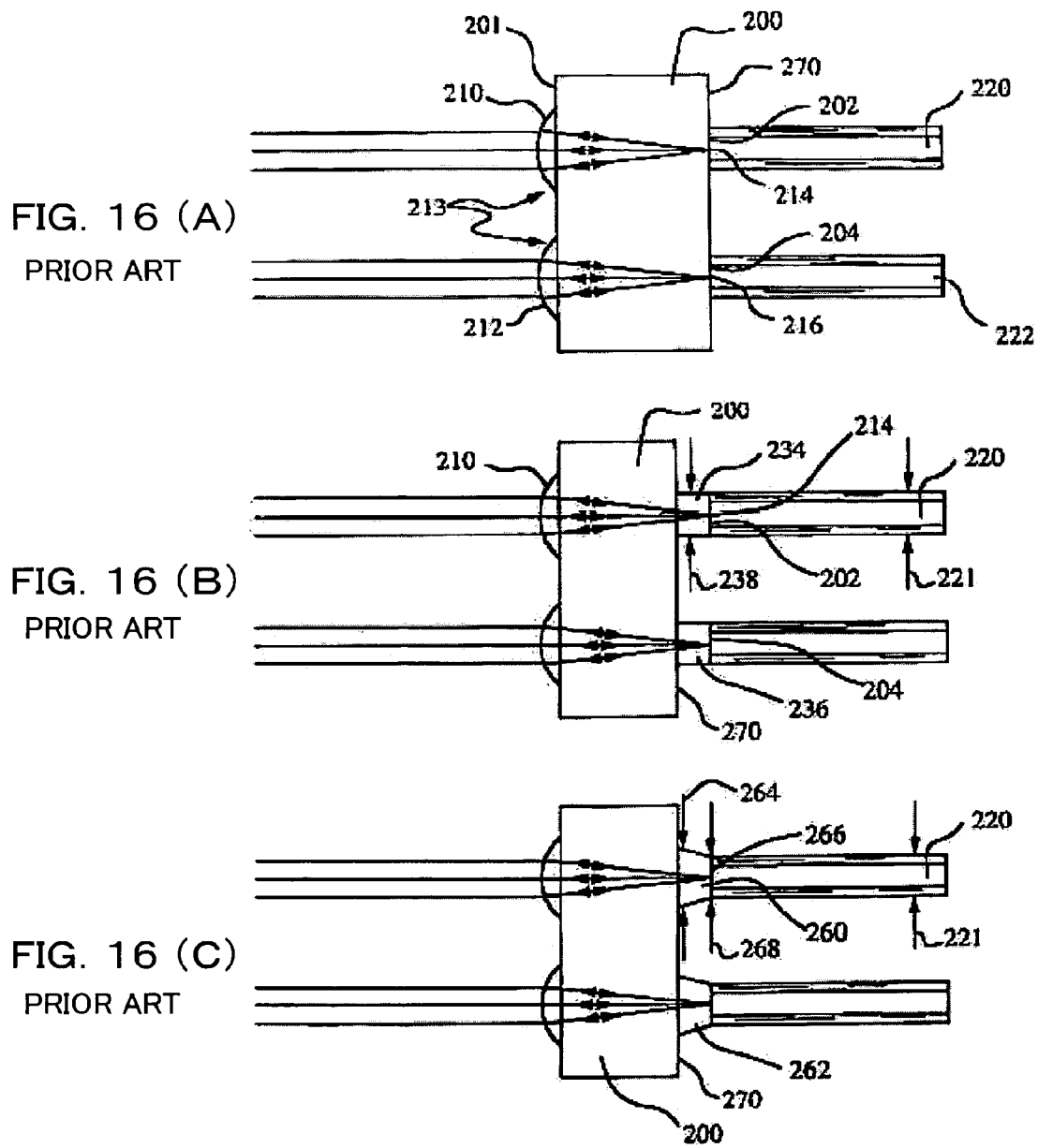

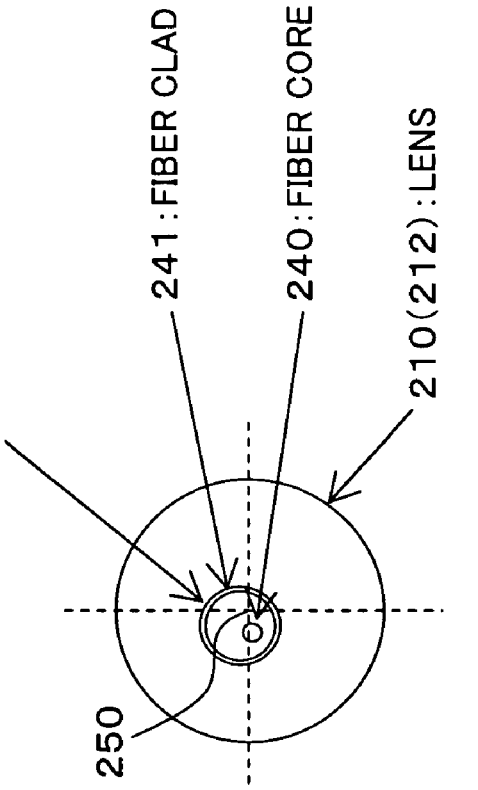
FIG. 17 (B) PRIOR ART
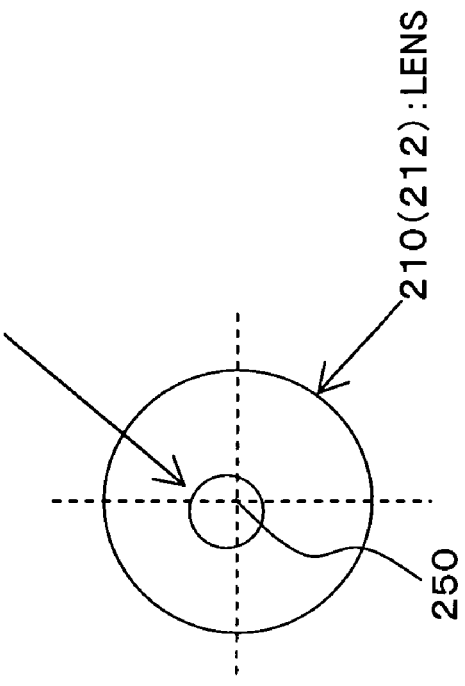
FIG. 17 (A) PRIOR ART

COLLIMATOR ARRAY AND METHOD FOR MANUFACTURING THE SAME

CROSS REFERENCE TO RELATED APPLICATIONS

This application is based on and hereby claims priority to Japanese Application No. 2004-315746 filed on Oct. 29, 2004 in Japan, the contents of which are hereby incorporated by reference.

BACKGROUND OF THE INVENTION (1) Field of the Invention

The present invention relates to a collimator array, which is one of optical parts to be applied to an optical communication system and a method for manufacturing the same.

(2) Description of the Related Art

For example, a collimator is an optical part for space-communicating collimated plural optical beams in parallel, which is applied to a spatial optical system type module such as an optical switch or the like. Normally, the collimator array is constructed by a plurality of lenses and a plurality of optical fibers. As a conventional collimator array, there is a configuration that a lens array and a fiber array are combined.

In this case, for example, the lens array may be configured by etching on a substrate such as glass, silicon or the like, a platy lens array may be formed by means of molding or the like, or the lens array may be configured by laying lenses in a V-shaped grove provided on a substrate. In addition, with respect to a fiber array, there are methods for manufacturing it by arranging fibers in the V-shaped groove and by using a fiber insertion hole that is processed at a high degree of accuracy.

These methods have an advantage that alignment can be made collectively by individually configuring the lens array and the fiber array, respectively and then, adhering the both by an adhesion bond or the like. However, according to this method, a deviation is generated at any cost at a center of each lens and each fiber due to each limit on arrangement accuracy of the lens array and the fiber array, and this results in occurrence of variation in an output angle of a beam.

A condition necessary for a collimator array is that there is little variation in a parallel degree and a beam diameter between the beams to be propagated in an array. In this case, the parallel degree between the beams is decided by the arrangement position accuracy of each fiber and each lens. A beam output angle θ is represented as follows:

$$\theta = \arctan(x/f)$$

where, x represents a difference between a fiber center position and a lens center position, and f represents a lens focal distance. Accordingly, if the arrangement accuracy of the fiber or the lens is not good, variation may occur in the beam output angle.

According to the above-described method, even if a method such as etching whereby the arrangement of the lens can be made with a high degree of accuracy is employed, a sub-micron order is a limit on the lens arrangement accuracy and even if the V-shaped groove is used, a sub-micron order is also a limit on the fiber arrangement accuracy. Further, since a core position of each fiber is decentered, variation in a beam output angle is large and about ±0.01° to ±0.1° of variation occurs.

In order to realize a higher degree of accuracy of the beam output angle, it is necessary that any one of the lens array and the fiber array is used as an individual part and alignment is carried out in accordance with arrangement variation in the one while observing an optical beam. This example is shown in FIG. 15(A) and FIG. 15(B). The configuration shown in these FIG. 15(A) and FIG. 15(B) are proposed by a patent document 1 to be described later, and in this configuration, positions (center axes) of a plurality of fibers 11 (a fiber part) with ferrules 12 is actively adjusted to a rear surface 10c of a platy micro lens array 10 (a substrate 10a) so as to coincide with an optical axis 19 of a lens 13 and fix the fibers 11 by an adhesion bond 14, respectively.

In the meantime, in these FIG. 15(A) and FIG. 15(B), a reference numeral 11a denotes an output end face of the fiber 11, a reference numeral 12a denotes an end face of a ferrule 12, a reference numeral 16 denotes a space (a gap) between the ferrule 12 and a rear surface 10c of the lens array 10, a reference numeral 18 denotes a focal position of the lens 13, a reference numeral 20 denotes a collimated light by the lens 13, and a reference numeral f denotes a focal distance of the lens 13, respectively. The fibers 11 are adhered by the adhesion bond 14 so that the focal position 18 of the lens 13 is located at a center of a core of the fiber 11 that is exposed on the end face 12a of the ferrule 12.

According to a method (structure) of this patent document 1, it is possible to coincide the center axis of the lens with the center axis of the fiber, relative variation in the output angle of each beam can be prevented and variation in a beam diameter can be also decreased by adjusting a thickness 14 of the adhesion bond in accordance with variation in the focal distance of the lens and further adjusting a distance between the fiber and the lens.

In addition, as a method for fixing the lens array and the fiber array, there is a method by fusion-connecting other than the adhesion. For example, according to a patent document 2 to be described later, a shape of a lens is limited to an ellipse SIL (solid immersion lens), however, there is a description with respect to the fiber fusion-connecting to the lens array. This fiber fusion-connecting is shown in FIG. 16(A), FIG. 16(B), and FIG. 16(C). In the meantime, all of these FIGS. 16(A) to 16(C) are pattern plain views of a collimator array and they correspond to FIGS. 6A to 6C of the patent document 2.

In these FIG. 16(A) to FIG. 16(C), a reference numeral 200 denotes a lens array substrate; a reference numeral 201 denotes a front surface (a substrate front surface) of the substrate 200; a reference numeral 270 denotes a rear surface (a substrate rear surface) of the substrate 200; reference numerals 202, 204, and 266 denote attachment positions of fibers (wave guide paths) 220 and 222, respectively; reference numerals 210, 212 denote a lens (SIL: Solid Immersion Lens) configuring a lens array 213, respectively; reference numerals 214, 216 denote focal positions of lenses 210, 212, respectively; and reference numerals 234, 236, 260, and 262 denote projecting parts, respectively.

In addition, an arrow 221 denotes a cross section of the fiber 220 at that position; an arrow 238 denotes a cross section of the projecting part 234 at that position; arrows 264 and 268 denote cross sections of the projecting part 260 at respective positions. In FIG. 16(B), the cross sectional shape of the projecting part 234 coincides with that of the fiber 220, and in FIG. 16(C), the cross sectional shape of the fiber attachment position 260 of the projecting part 268 coincides with that of the fiber 220.

In the meantime, in FIG. 16(A), the lenses 210 and 212 are formed on one surface (the substrate front surface) 201 of the substrate 200, and the fibers 220 and 222 are fusion-connected on the positions corresponding to the lenses 210 and 212 of the other surface (the substrate rear surface) 270 of the substrate 200, respectively. This structure is nearly the same as the structure described in the patent document 1 shown in FIG. 16 except for a point that the ferrule 12 is not attached to the fibers 220 and 222.

On the other hand, in FIG. 16(B) and FIG. 16(C), the projecting parts 234 and 236 (260, 262) are formed at the positions corresponding to the positions where the lenses 210 and 212 of the substrate rear surface 270 are formed, and the fibers 220 and 222 are fusion-connected to these projecting parts 234 and 236 (260, 262), respectively. Thus, by providing the projecting parts 234 and 236 (260, 262), as shown in FIG. 16(B) (FIG. 16(C)), the fusion-connecting by arc discharge and $CO_2$ laser irradiation or the like becomes possible as compared to a case that the fibers 220 and 222 are directly fusion-connected to the substrate rear surface 270.

In addition, by coinciding appearances (cross sectional shapes) of the fiber connected faces of the projecting parts 234 and 236 or 260 and 262 with the fiber appearance (the cross sectional shape), there is an advantage that alignment of the center of the lens and the center of the fiber can be obtained easily. Actually, if the projecting parts 234 and 236 or 260 and 262 as shown in these FIGS. 16(B) and 16(C) are used, upon fusion-connecting the fibers, a force may act so that the appearances of the both coincide with each other by the surface tension generated at a connected portion that is fusion-connected upon fusion-connecting the fibers, and this makes it possible to fix the fibers in such a manner that the appearances of the projecting parts 234 and 236 or 260 and 262 coincide with the appearances of the fibers.

In the meantime, as the art related to an apparatus for fusion-connecting the fiber, for example, the art described in the following non-patent document 1 is conceivable. [patent document 1] a specification of U.S. Pat. No. 6,587,618 [patent document 2] a specification of U.S. Pat. No. 6,643,068 [non-patent document 1] Akio Tanabe and other nine persons, "Development of Core Direct Sight Type Fusion Apparatus S175", Furukawa Denko Times, July 1999, No. 104, pp. 69-74

However, at first, according to the art in the above-described patent document 1, adhesion is used to connect the fiber to the substrate, so that fixing strength is weak. In addition, since a direction of a lens focal distance is adjusted by changing the thickness of the adhesion bond, a connection layer becomes thick and thus the art lacks reliability. Further, the connected position may be deviated by curing and contraction of the adhesion bond upon bonding.

On the contrary, according to the art in the above-described patent document 2, since the fiber is connected to the substrate by fusion-connecting, the fixing strength is improved as compared to the art according to the patent document 1, however according to the method of directly fusion-connecting the fiber on the substrate as described with reference to FIG. 16(A), it is difficult to carry out arc discharge or laser irradiation to individual connected portions at a pinpoint and the fusion-connecting operation is very difficult because the unnecessary substrate parts are fused by heat conduction to the periphery. In addition, it is also difficult to adjust the direction of the lens focal distance.

On the other hand, according to the methods above-described with reference to FIG. 16(B) and FIG. 16(C), the fusion-connecting operation is made simple, however, the appearances of the fiber connected faces of the projecting parts 234, 236 or 260, 262 formed on the substrate rear surface 270 and the fiber appearances are fixed so that they coincide with each other by the surface tension. This phenomenon is also described in the above-described non-patent document 1, for example, with respect to a case of fusion-connecting the fibers of the same appearance with each other.

Due to the phenomenon as same as this, a deviation may occur between the lens center axis of the substrate front surface 201 and the center axes of the projecting parts 234, 236 or 260, 262 of the substrate rear surface 270. In addition, if the fiber core is decentered, there may be variation also in the beam output angle.

For example, as shown in a patterned manner in FIG. 17(A), the center axis of the lens 210 (212) on the substrate front surface 201 and the center axis of the projecting part 234 (236, 260, 262) on the substrate rear surface 270 formed on the position corresponding to this lens 210 (212) are deviated, and as shown in a patterned manner in FIG. 17(B), it is assumed that a fiber core 240 is decenterd with respect to a fiber clad 241. With respect to the center axis and the decentering, a deviation to a lens center 250 is not more than 0.5 to 1 µm, however, in these FIG. 17(A) and FIG. 17(B), the deviation is overly illustrated for the sake of convenience of explanation.

In addition, if the fiber 220 (222) is fusion-connected to the projecting parts 234 (236, 260, 262) under such a state, as a result of a fact that the appearances of the fiber connected faces of the projecting parts 234, 236 or 260, 262 and the fiber appearances are fixed so that they coincide with each other more by the surface tension, the fiber core 240 is largely deviated from the lens center 250, and as shown in a patterned manner in FIG. 18, there is variation in the beam output angle. In addition, if there is variation in the thickness of the projecting part 234 (236, 260, 262) and also in the lens focal distance, it leads to variation in the collimated state (the beam diameter) of the beam.

SUMMARY OF THE INVENTION

The present invention has been made taking the foregoing problems into consideration and an object of which is to provide a collimator having few variations in an output beam angle and a diameter of an output beam, and a method for manufacturing the same.

Another object of the present invention is to provide a collimator with excellent strength and a method for manufacturing the same.

In order to attain the above-descried object, the collimator according to the present invention may comprise a substrate; a plurality of lenses formed on one face of the substrate; and a plurality of projecting parts, each of which is formed on a portion corresponding to the lens on other face of the substrate, respectively and is fusion-connected to an optical fiber, respectively; wherein an area of the fusion-connected face with respect to the optical fiber of the projecting part is set to be larger than a cross sectional area of the optical fiber.

In this case, the projecting part may be formed by forming a concave part around a part corresponding to the lens on the other face of the substrate.

In addition, a fiber protecting member for protecting the fiber may be provided on the other face of the substrate.

Further, a dereflection coating may be applied at least on the lens.

In addition, light shielding means for shielding unnecessary light may be provided on a portion other than the lens on the one face of the substrate.

Further, each of the lenses and each of the optical fibers may be arranged on the substrate one-dimensionally, or may be arranged on the substrate two-dimensionally, and or may be on the substrate in a staggered row.

In the next place, a method of manufacturing a collimator array may comprise the steps of forming a plurality of lenses on one face of the substrate and forming a projecting part, of which a cross sectional area of its surface is larger than the cross sectional area of an optical fiber, on a part corresponding to the lens on the other face of the substrate; and fusion-connecting the optical fiber on the surface of the projecting part.

In this case, fusion-connecting of the optical fiber may be carried out after heating only the projecting part preliminarily upon fusion-connecting the optical fiber.

According to the above-described present invention, by fusion-connecting the optical fiber to the projecting part formed on the other face of the substrate where the area of the fusion-connected face with respect to the optical fiber is set to be larger than the cross sectional area of the optical fiber, it is possible to position the fiber core and the lens center to be fixed with a very high degree of accuracy while preventing occurrence of deviation by the surface tension upon fusion-connecting the fibers.

BRIEF DESCRIPTION OF THE DRAWINGS

FIG. 2 is a pattern perspective view showing the appearance of the collimator array of the first embodiment according to the present invention;

FIG. 3 is a pattern plain view partially showing the collimator array shown in FIG. 1 and FIG. 2;

FIG. 15(A) and FIG. 15(B) are views showing a structure of a conventional collimator array, respectively;

FIG. 16(A), 16(B), and FIG. 16(C) are pattern plain views showing a structure of a conventional collimator array, respectively;

FIG. 17(A) and FIG. 17(B) are views illustrating an object (deviation) of the conventional collimator array.

DESCRIPTION OF THE PREFERRED EMBODIMENT(S)

(1) Explanation of a First Embodiment

Figure 1:
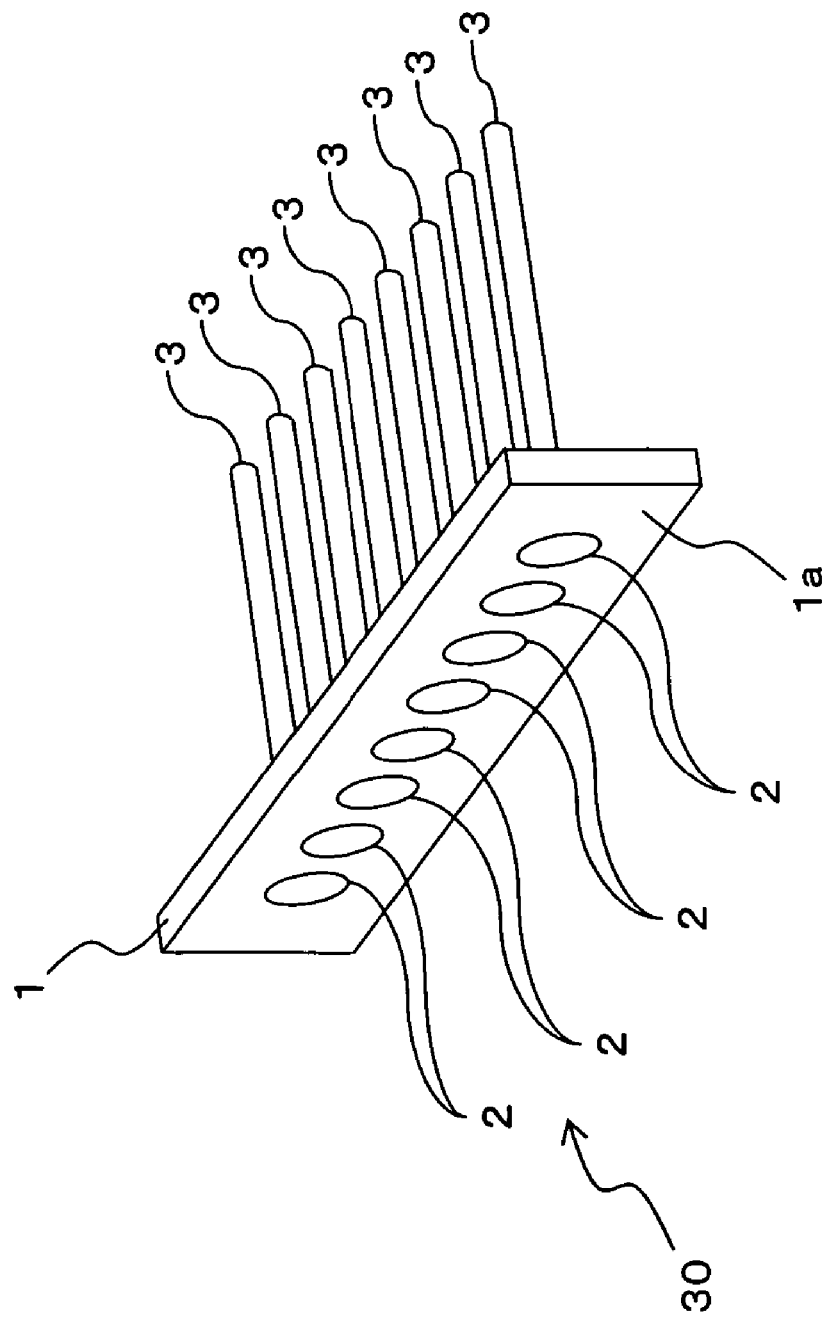
FIG. 1 is a pattern perspective view showing an appearance of a collimator array of a first embodiment according to the present invention.

FIG. 1 and FIG. 2 are pattern perspective views showing an appearance of a collimator array of a first embodiment according to the present invention, and FIG. 3 is a pattern plain view partially showing the collimator array shown in FIG. 1 and FIG. 2.

As shown in these FIG. 1 to FIG. 3, a collimator array 30 according to the present embodiment is configured by, for example, a platy substrate (a lens array substrate) 1 made of a glass material (quartz), a plurality of micro lenses (hereinafter, simply referred to as "lens") arranged (formed) on one face (front surface) 1a of this lens array substrate 1 one-dimensionally (in an array), a plurality of projecting parts 4 that are provided at positions corresponding to respective lenses 2 of the other face (a rear surface) 1b of the lens array substrate 1, and a plurality of fibers 3 that are fusion-connected on a front surface (a fiber connected portion) 4a of respective projecting parts 4.

In this case, according to the present embodiment, the lens array substrate 1 can be also manufactured by etching or molding, or using a V-shaped groove or the like. In addition, respective projecting parts 4 can be formed on a rear surface 1b of the substrate, for example, by etching or the like. In the meantime, either of the step of forming the lens 2 and the step of forming the projecting part 4 on the lens array substrate 1 may be carried out first.

According to the present embodiment, as shown in FIG. 3, respective projecting parts 4 are formed so that a diameter (an area) of its front surface (the fiber connected portion) 4a is larger than a diameter (hereinafter, referred to as a clad diameter) of the fiber clad 32, namely a cross sectional area of the fiber clad 32, and the combined thickness of the lens array substrate 1 and projecting parts 4 is set in accordance with a focal distance of each lens 2, namely, the focal position of each lens 2 is located at a center of a fiber core 31. In the meantime, when there is variation in the focal distance of each lens 2, the thickness of the projecting part 4 is adjusted by the polishing process or the like.

Figure 4B:
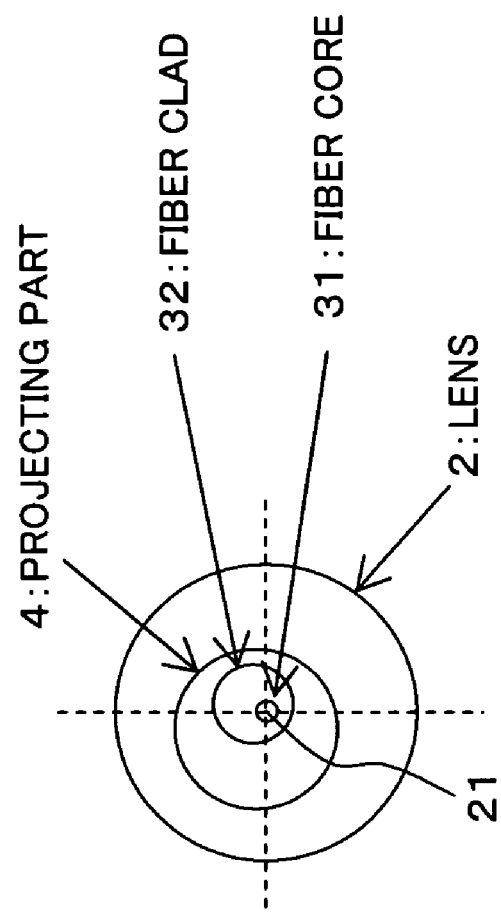
FIG. 4(A) and FIG. 4(B) are views illustrating a positioning step upon manufacturing the collimator shown in FIGS. 1 to 3.
Figure 4A:
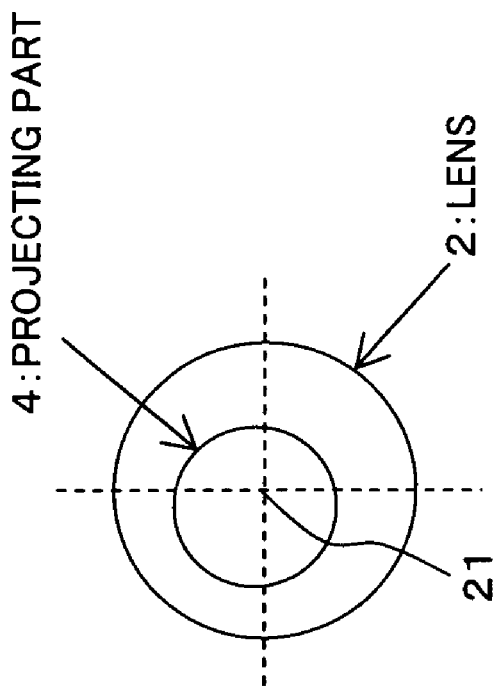

Then, upon fusion-connecting a fiber 3 on the lens array substrate 1 (the projecting part 4), by carrying out the active alignment with the light emitted from a tip of the fiber, as shown in FIG. 4(A) and FIG. 4(B), positioning may be performed so that a center of a lens 21 coincides with a center of a fiber core 31 including decentering of the fiber.

The projecting part 4 not only corrects variation in the beam diameter by correcting variation in the focal distance of the lens 2, but also has a function of making fusion-connecting easier by irradiating a $CO_2$ laser or the like to its front surface (the fiber connected portion) 4a upon fusion-connecting and preliminarily heating only the projecting part 4 in advance. Then, since the diameter of the projecting part 4 (the fiber connected portion 4a) is larger than the diameter of the clad, no deviation occurs by the surface tension at the portion where the fiber 3 is fused upon fusion-connecting. In the meantime, any shape of the projecting part 4 is available if the diameter (the cross sectional area) of the fiber connected portion 4a is larger than the diameter of the clad. For example, as shown in FIG. 3, its side wall may be formed in a trapezoid, or other shapes such as a taper and steps may be available.

As described above, according to the collimator array 30 of the present embodiment, by adopting a structure that the fiber 3 is fusion-connected to the projecting part 4 where the diameter of the fiber connected portion 4a formed on the rear surface 1b of the lens array substrate 1 is set to be larger than the diameter of the clad of the fiber 3, it is possible to position the fiber core 31 and the center of the lens 21 to be fixed with a very high degree of accuracy while preventing occurrence of deviation by the surface tension upon fusion-connecting the fibers. As a result, the collimator array 30 with very few variations in the beam output angle can be realized easily.

Figure 8:
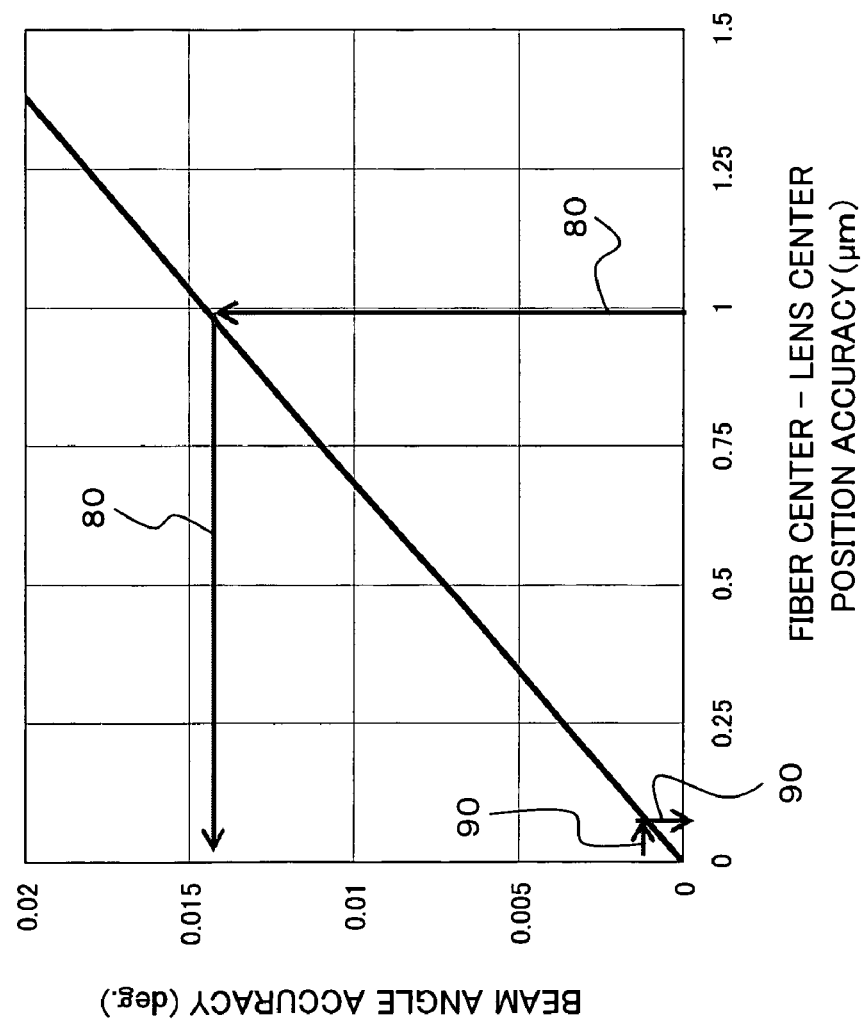
FIG. 8 is a view explaining a limit on accuracy of a beam output angle of the collimator arrays of respective embodiments in comparison with conventional one.

For example, in the collimator array 30 configured in such a manner that the fiber array and the lens array are individually configured as the conventional collimator to be integrally bonded by the adhesion bond, a limit on accuracy of the positioning of the fiber core center and the lens center is about 1 μm, so that the limit on the accuracy of the beam output angle is about 0.014° as shown by an arrow 80 in FIG. 8. However, according to the collimator array 30 of the present embodiment, as shown by an arrow 90 in FIG. 8, the limit on the accuracy of the beam output angle can be remarkably improved to the accuracy of the beam output angle (about 0.001°) required for the optical switch (the wavelength selecting switch) of the space connecting type to be described later.

In addition, by adjusting the thickness of the projecting part 4 in accordance with the focal distance of each lens 2 with polishing process or the like, the focal position of each lens 2 can coincide with the center of the fiber core 31 with a high degree of accuracy, and this makes it also possible to make the variation in the diameter of the beam very small.

Further, according to the present example, there are no extra parts, so that it is possible to realize the small collimator array 30 at a low cost. In addition, since fusion-connecting is employed for connecting (fixing) the fiber 3, sufficient connection strength can be secured differently from the case of adhesion and more reliability can be obtained. In addition, by composing the lens 2 and the fiber 3 using the same material (quartz), coefficients of thermal expansion of the both are the same, so that the variation in the output angle of the beam due to variation in temperature does not occur in principle.

In the meantime, not essential, but AR (Anti-Reflective) coating (dereflection coating) may be applied to at least each lens 2. Thus, both of the fiber 3 and the lens array substrate 1 (the projecting part 4) are made of quartz, so that refractive indexes on the fusion-connected face (namely, the fiber connected portion 4a) coincide with each other or substantially coincide with each other, which decreases the reflection on the fusion-connected face. In addition, the light that is reflected from the lens surface and is reconnected to the fiber 3 can be decreased by the AR coating. Further, since a transmission factor is improved by the AR coating, the light power loss of the transmitted beam can be also decreased.

(2) Explanation of a Second Embodiment

Figure 5:
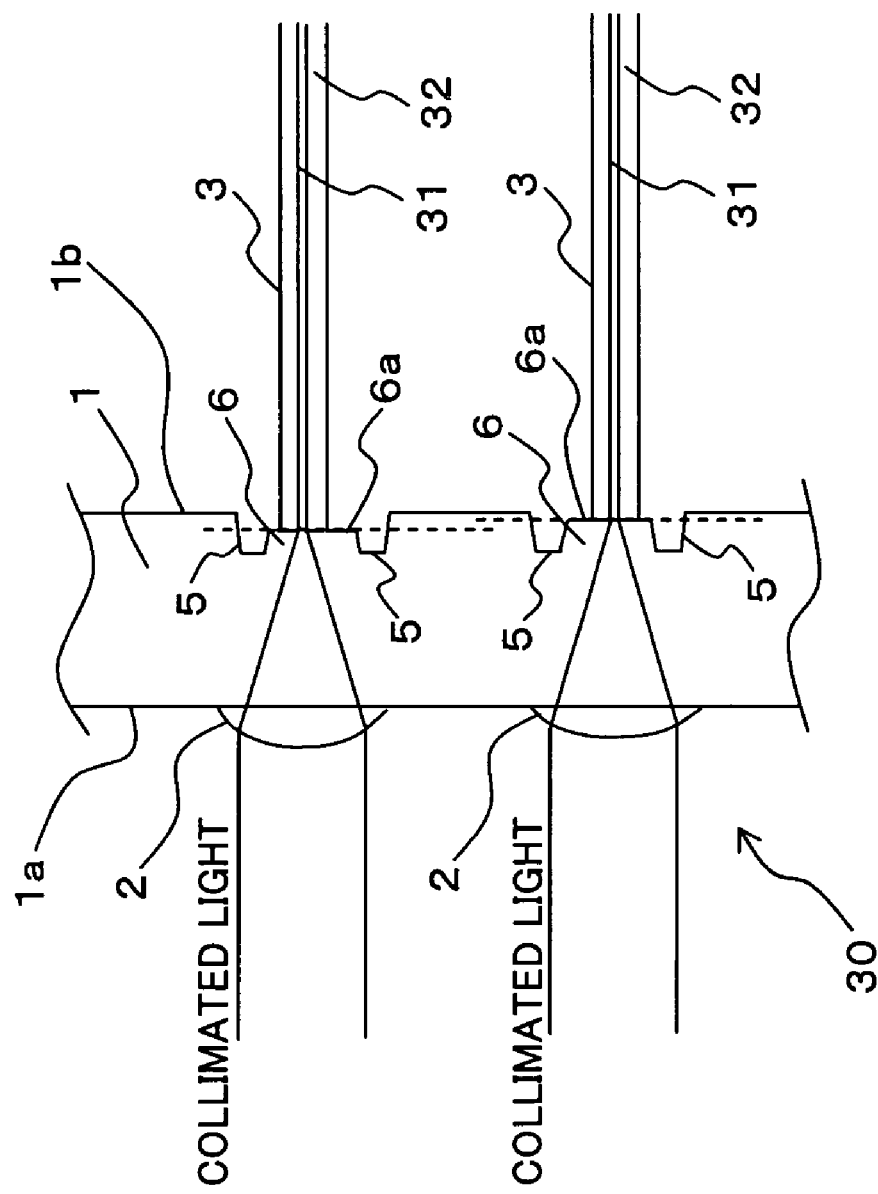
FIG. 5 is a pattern plain view partially showing the collimator array according to a second embodiment of the present invention.

FIG. 5 is a pattern plain view partially showing the collimator array according to a second embodiment of the present invention, and this corresponds to FIG. 3 of the first embodiment. In the meantime, the entire appearance is equal or similar to that shown in FIG. 1 and in this FIG. 5, the parts given the same reference numerals as the above-described reference numerals are equal or similar to the above-described parts unless particularly stated.

The collimator array 30 shown in FIG. 5 is configured in such a manner that a projecting part 6 is relatively formed by forming a concave part 5 around a portion corresponding to the projecting part 4 of the rear surface 1b of the substrate (a portion corresponding to the lens 2) in place of forming the projecting part 4 as shown in FIG. 2 and FIG. 3 on the rear surface 1c of the lens array substrate 1 as the first embodiment.

In this projecting part 6, a diameter (an area) of its front surface (the fiber connected portion) 6a is set to be larger than the diameter of the fiber clad 32 in order to prevent the deviation due to the surface tension upon fusion-connecting the fiber. In addition, by individually adjusting the thickness of each projecting parts 6 by the polishing process or the like, it is also possible to individually adjust the focal distance of each lens 2.

Thus, by forming the projecting part 6 with the concave part 5 provided, thermal resistance around the fiber upon fusion-connecting the fiber can be increased, so that preliminary heating to the projecting part 6 can be made easier and adjustment of the focal distance for each lens 2 becomes possible.

Accordingly, also in the present embodiment, an effect and advantage same as those in the first embodiment can be obtained. In other words, it is possible to position the fiber core 31 and the center of the lens 21 to be fixed with a very high degree of accuracy while preventing occurrence of deviation by the surface tension upon fusion-connecting the fibers, and by adjusting the thickness of the projecting part 6 in accordance with the focal distance of each lens 2, the focal position of each lens 2 can coincide with the fiber core 31 with a high degree of accuracy. As a result, the collimator array 30 with very few variations in the beam output angle and the beam diameter can be realized easily.

In addition, also according to the present embodiment, since there are no extra parts, so that it is possible to realize the small collimator array 30 at a low cost. In addition, since fusion-connecting is employed for connecting (fixing) the fiber 3, sufficient connection strength can be secured differently from the case of adhesion and more reliability can be obtained. In addition, by composing the lens 2 and the fiber 3 using the same material (quartz), coefficients of thermal expansion of the both are the same, so that the variation in the output angle of the beam due to variation in temperature does not occur in principle.

In the meantime, also according to the present embodiment, not essential, but if the AR coating is applied to each lens 2, the same advantage as the first embodiment can be obtained.

(3) Explanation of a Modified Example

Figure 6:
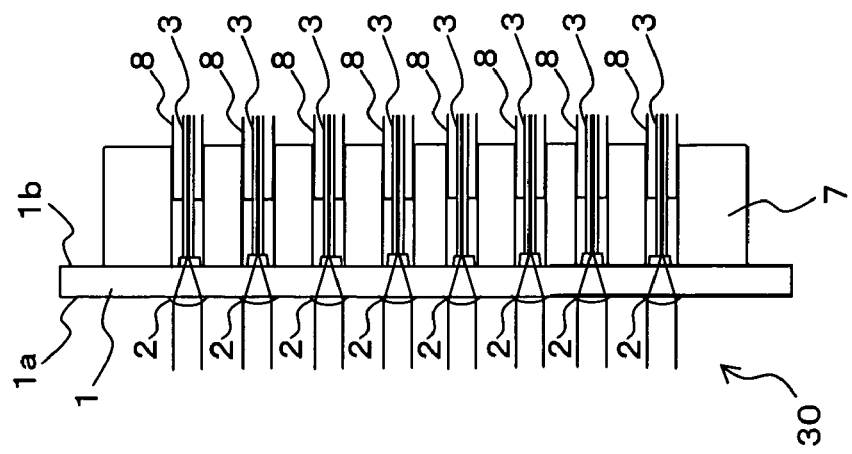
FIG. 6 is a pattern plain view showing a modified example of the collimator array shown in FIGS. 1 to 3.
Figure 7:
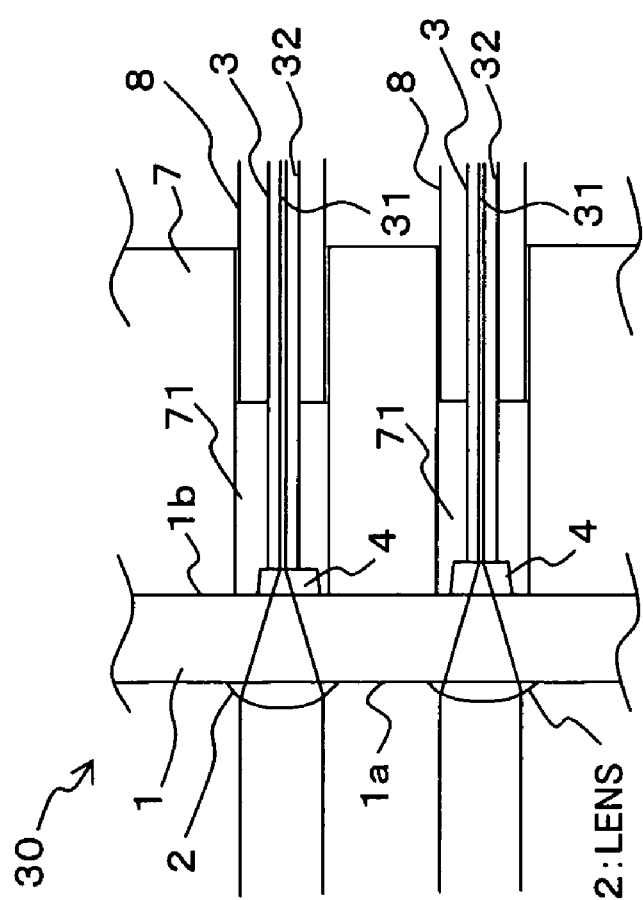
FIG. 7 is a pattern plain view showing the collimator array shown in FIG. 6 while enlarging a portion thereof.

FIG. 6 is a pattern plain view showing a modified example of the above-described collimator array, and FIG. 7 is a pattern plain view showing the collimator array shown in FIG. 6 while enlarging a portion thereof. The collimator array 30 shown in these FIG. 6 and FIG. 7 are configured so as to protect each fiber 3 with a narrow diameter by adhering a fiber protecting member 7 on the rear surface 1b of the lens array substrate 1. In the meantime, in these FIG. 6 and FIG. 7, the collimator array 30 shown in FIGS. 1 to 3 according to the first embodiment is assumed, however, the collimator array 30 shown in FIG. 5 according to the second embodiment can be assumed.

Specifically, in this fiber protecting member 7, a through hole part 71 having a larger diameter than that of a fiber coating member 8 coating each fiber 3 and capable of allowing each fiber 3 including the fiber coating member 8 to penetrate is arranged in an array in accordance with the arrangement of each fiber 3, and as described above, after fusion-connecting each fiber 3, the fiber protecting member 7 is bonded on the rear surface 1b of the lens array substrate 1 by the adhesion bond while putting each fiber 3 (the fiber coating member 8) through each through hole part 71 of this fiber protecting member 7, and further, inside of the through hole part 71 is bonded with the fiber coating member 8.

Thereby, while securing the strength of the fusion-connected portion sufficiently, it is possible to protect the fiber 3 by effectively preventing a damage, cutting or the like due to bending of the fiber 3 itself as a narrow diameter part other than the fiber coating member 8. In the meantime, if this fiber protecting member 7 is made of the same material (quartz) as the lens array substrate 1 and the fiber 3, these coefficients of thermal expansion are the same, so that no thermal stress is generated and each fiber 3 can be protected stably.

Figure 9:
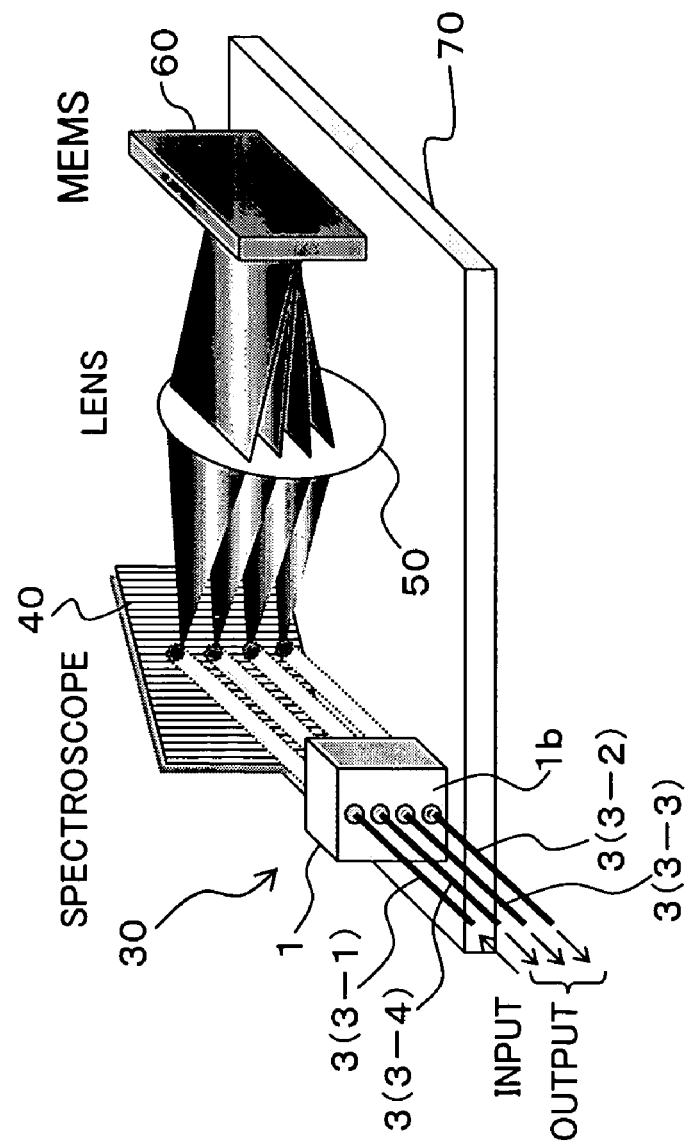
FIG. 9 is a pattern perspective view showing a structure of an optical switch (a wavelength selecting switch) of a space connecting type to which the collimator arrays of respective embodiments are applied.

(4) Application to an Optical Switch (a Wavelength Selecting Switch) of a Space Connecting Type FIG. 9 is a pattern perspective view showing a structure of an optical switch (a wavelength selecting switch) of a space connecting type to which the above-described collimator array 30 is applied, and the wavelength selecting switch shown in FIG. 9 is configured with the collimator array 30 having the above-described structure (at least the lens array substrate 1, the lens 2, the projecting part 4 or the fiber 3), a spectroscope 40, a condenser lens 50, and a micro mirror array unit 60 on a substrate 70.

In this case, in the collimator array 30 shown in FIG. 9, four fibers (ports) 3-1 to 3-4 in total including one input fiber 3-1 corresponding to an input port (hereinafter, may be referred to as an input port 3-1) and three output fibers 3-1, 3-2, and 3-3 corresponding to an output port (hereinafter, may be referred to as output ports 3-1, 3-2, and 3-3) are fusion-connected to the projecting part 4 or 6 as described above, and they are configured as a collimator array of one input and three outputs. Further, if respective fibers (ports) 3-1 to 3-4 are not distinguished, they are simply described as a fiber (a port) 3.

The spectroscope 40 outputs a collimated light emitted from the collimator array 30 through the input fiber 3 to different directions (angles) depending on a wavelength, and further, connects the light reflected by the micro mirror array unit 60 and inputted through a line focus lens 50, to the lens 2 corresponding to the output fiver 3 of the collimator array 30. For example, the spectroscope 40 can be configured by using a diffraction grating. The diffraction grating is an optical element having a plurality of parallel grooves that are regularly carved on the glass substrate, and it gives the output angles that are different for each wavelength to a plurality of wavelength components to be inputted at a predetermined angle by using a diffraction phenomenon of the light. Due to this operation, the wavelength can be separated.

Figure 10:
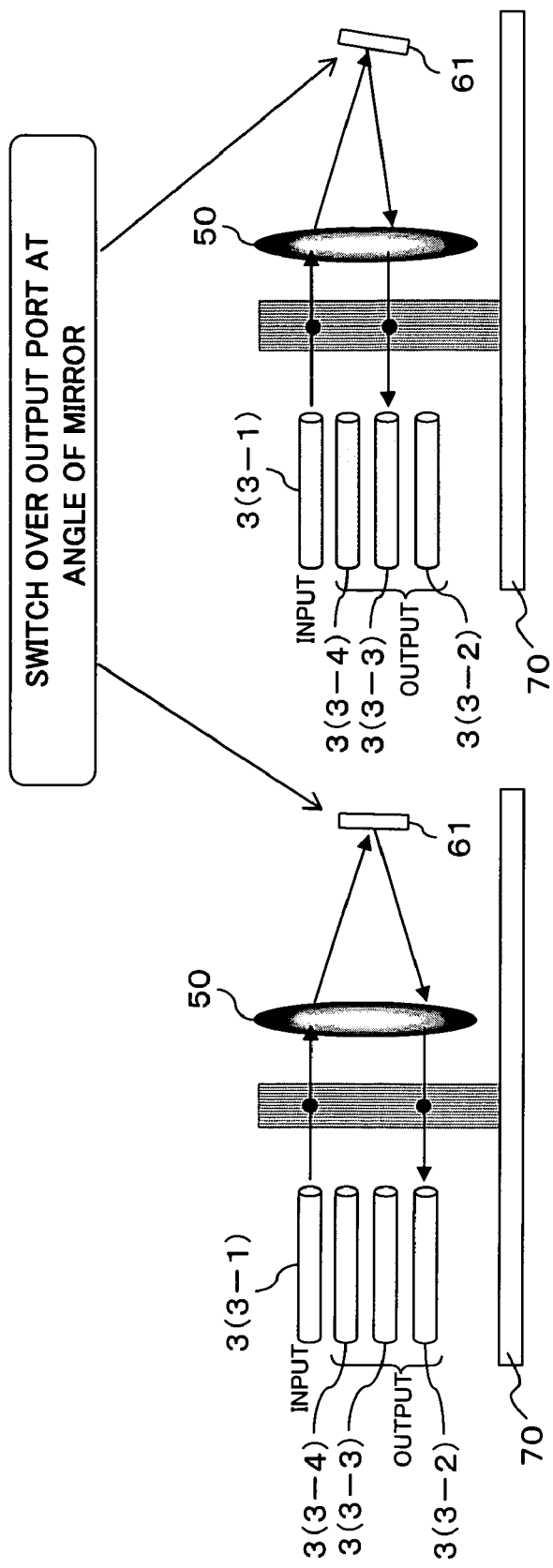
FIG. 10(A) and FIG. 10(B) are views showing the operation of the wavelength selecting switch (switching of a channel) shown in FIG. 9.

The micro mirror array unit 60 may function as a switching element for switching the port by reflecting the light inputted from the input fiber 3 to any output fiber 3 and the micro mirror array unit 60 is configured in such a manner that a micro mirror 61 (see FIG. 10(A) and FIG. 10(B)) represented by a MEMS (Micro Electro Mechanical Systems) is arranged in an array. Specifically, one micro mirror 61 is arranged with respect to one wavelength that is separated from the spectroscope 40. The micro mirror 61 is configured so that an angle of gradient is variable as shown in FIG. 10(A) and FIG. 10(B), and in accordance with the angle of gradient, the output ports 3-2, 3-3, and 3-4 of each wavelength component are determined (or switched).

The condenser lens 50 may condense the light of one wavelength that is separated by the spectroscope 40 on a predetermined micro mirror 61 while condensing the light reflected by any micro mirror 61 and outputting it to the collimator array 30 via the spectroscope 40.

According to such a wavelength selecting switch, in accordance with a wavelength dispersion ability of the spectroscope 40, the focal distance of the condenser lens 50 should be decided. The wavelength that is the most popular at present in a D-WDM (Dense-Wavelength Division Multiplex) is about 0.8 nm interval at a bandwidth of 1.55 µm, and a resolving power of the diffraction grating available at this wavelength band is about 0.1 deg/nm. If an interval of the micro mirror 61 corresponding to each wavelength is made in the range of 100 µm to 200 µm, a focal distance of the condenser lens 50 of about 100 mm is required. Accordingly, in the view of a length of an optical path, the distance of not less than 200 mm is required from the collimator array 30 to the micro mirror array unit 60. In order to reflect the light by a mirror area of the micro mirror 61 having the size of about 100 µm after transmitting the light in a space through such a long distance, as described above with reference to FIG. 8, the accuracy limit of the beam output angle with respect to the collimator array 30 is needed to be about 0.001°, and in addition, it is necessary to make the variation in the diameter of the beam smaller as much as possible.

In the meantime, in the case of applying the collimator array 30 to such a wavelength selecting switch, if the angle of gradient of the micro mirror 61 is made variable for switching of the output port (namely, switching of a channel) as described above, its reflected light may move on a portion other than the lens 2 on the front surface 1a of the collimator array 30 (the lens array substrate 1). In this case, the lens array substrate 1 is made of quartz, and even if the light reflected by the micro mirror array unit 60 is inputted in the part other than the lens 2 of the front surface 1a, the partial light is propagated (a stray light) in the lens array substrate 1 to be inputted in the fiber 3, so that across talk between the channels is generated.

Figure 11:
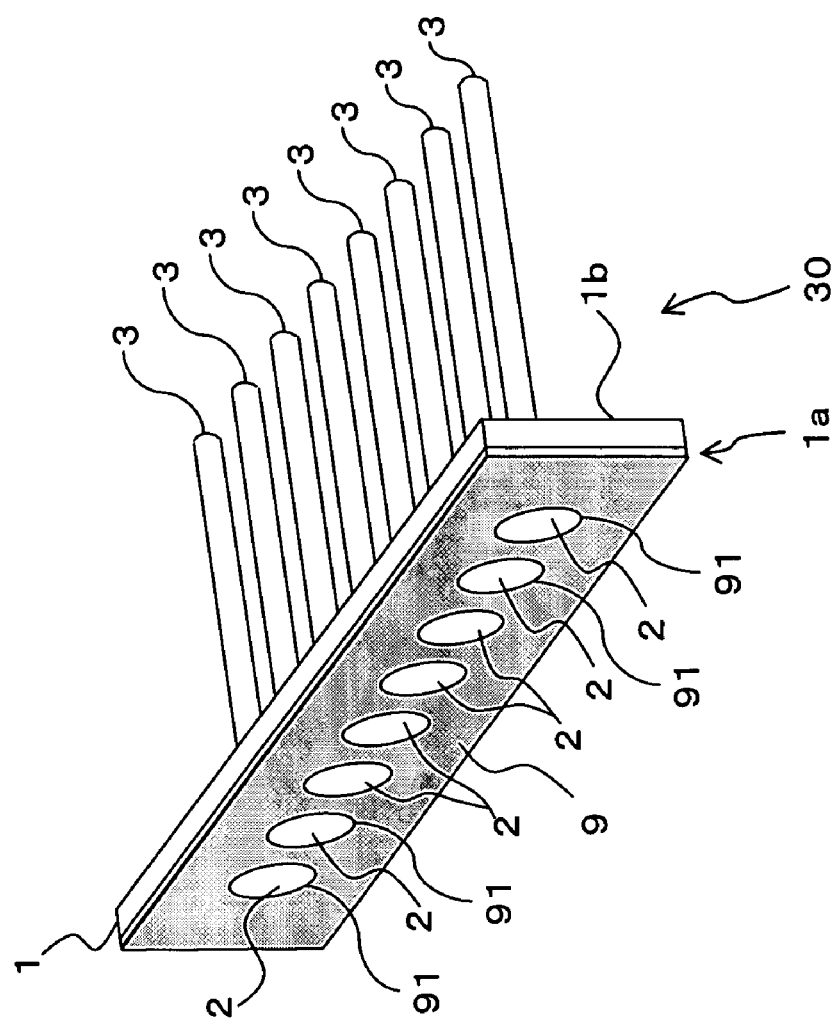
FIG. 11 is a pattern perspective view showing an appearance when providing light shielding means to the collimator array shown in FIG. 1.
Figure 12:
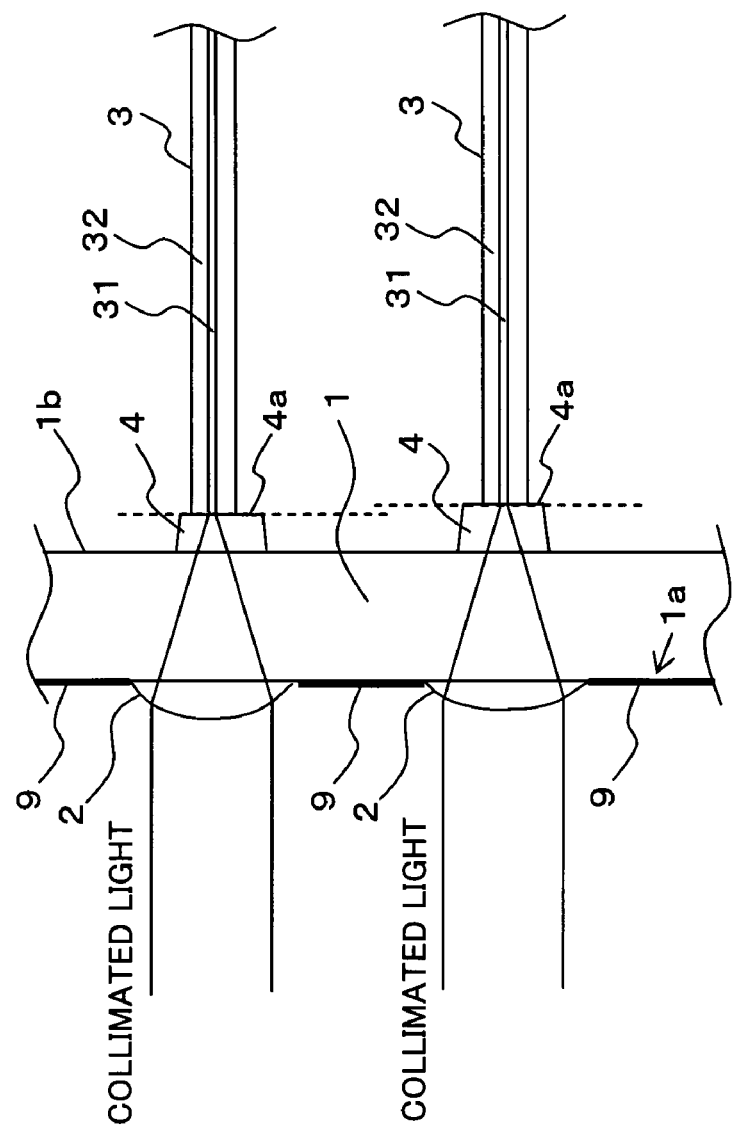
FIG. 12 is a pattern plain view of the collimator array shown in FIG. 11.

Therefore, according to the present embodiment, for example, as shown in FIG. 11 and FIG. 12, light shielding means 9 is provided to cover the part other than the lens 2 of the front surface 1a of the lens array substrate 1 as the input surface of the reflected light.

This light shielding means 9 may be made by forming a film on the glass substrate to reflect or absorb the light on the part that is light-shielded on the glass substrate. In order to reflect the light, a thin film made of metal is deposited or a reflection film is formed using a dielectric multilayered film. In order to absorb the light, there is a method to apply a resin material or the like. However, since the dielectric reflection film strongly depends on the input angle of the light, and a light absorbing material needs a thickness to some degrees in order to secure the sufficient light attenuation, the metal film is the most practical for the light attenuation, as a counter measure against a stray light.

According to the example shown in FIG. 11, as the light shielding means 9, the quartz glass substrate which has a hole (an opening part) 91 in accordance with a size (a diameter) of the lens 2 on a part corresponding to each lens 2 and to which the metal film is deposited is used, and this substrate is fusion-connected and fixed on the front surface 1a of the lens array substrate 1. On the contrary, according to the example shown in FIG. 12, a light shielded film is formed as the light shielding means 9 by depositing the metal thin film made of chrome on the front surface 1a of the lens array substrate 1 by a vacuum depositing method.

Thus, by providing the light shielding means 9 on the front surface 1a of the lens array substrate 1, it is possible to effectively prevent the cross talk between the channels that may be generated in accordance with switching of the channels.

(5) Arrangements of the Lens 2 and the Fiber 3

Figure 13:
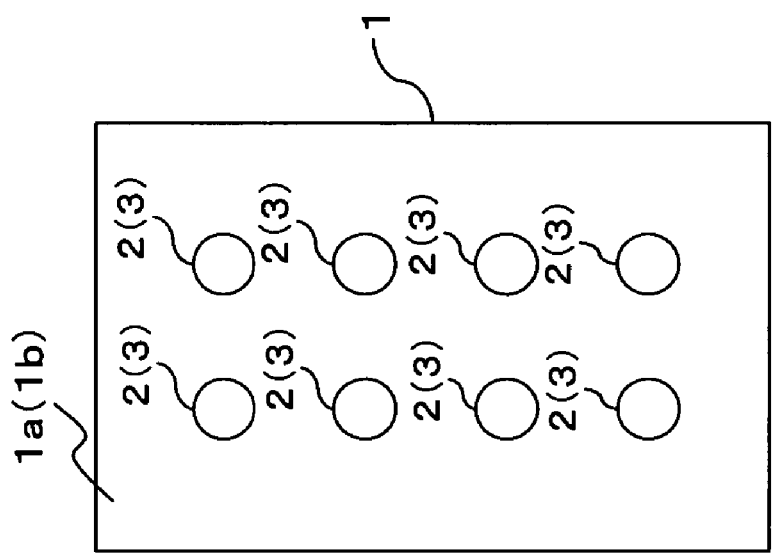
FIG. 13 is a pattern plain view showing a modified example (a two-dimensional arrangement) of arrangements of the lenses and the fibers of the collimator arrays shown in FIG. 1, FIG. 2, FIG. 3, FIG. 5, FIG. 11 or FIG. 12.
Figure 14:
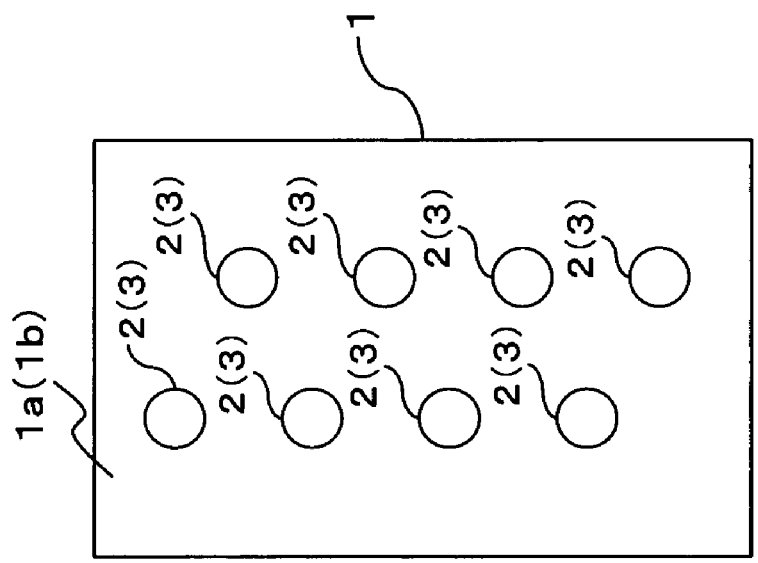
FIG. 14 is a pattern plain view showing a modified example (a staggered row arrangement) of arrangements of the lenses and the fibers of the collimator arrays shown in FIG. 1, FIG. 2, FIG. 3, FIG. 5, FIG. 11 or FIG. 12.
Figure 18:
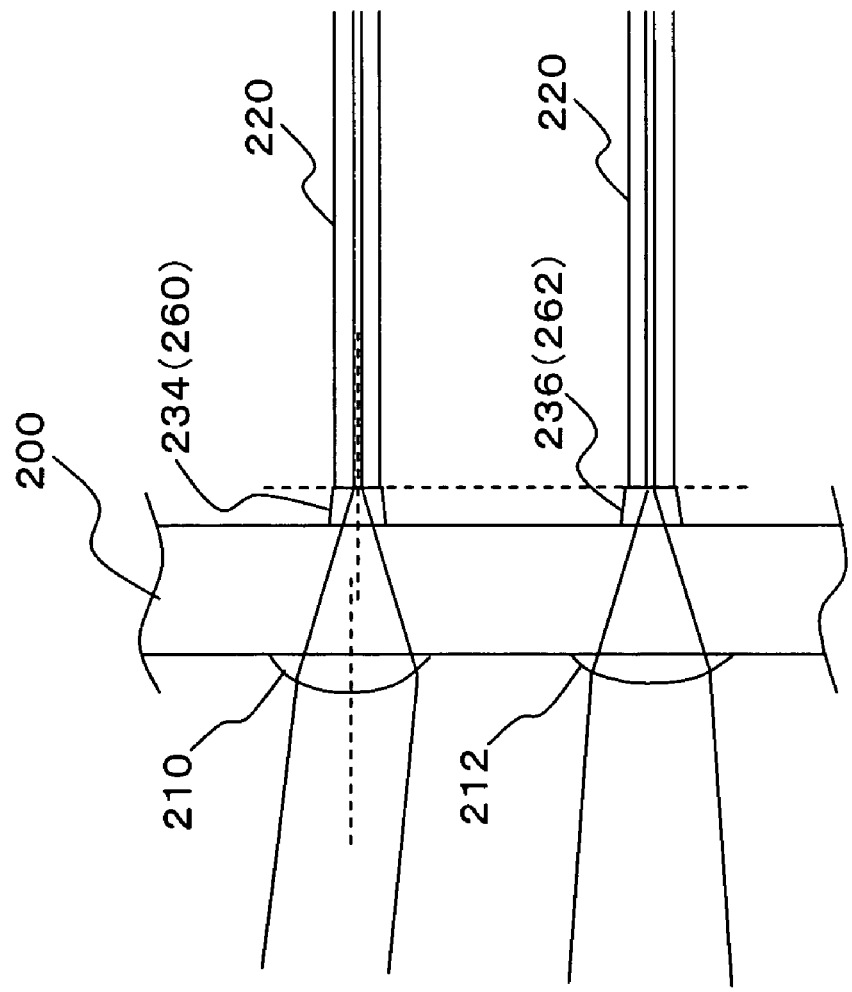
FIG. 18 is a pattern plain view illustrating an object (variation in the beam output angle) of the conventional collimator array.

According to the above-described embodiment, the lens 2 and the fiber 3 are arranged on the lens array substrate 1 in one row (one-dimensionally). However, the present invention is not limited to this, and for example, as shown in a patterned manner in FIG. 13, they may be arranged in two rows (two-dimensionally) or as shown in a patterned manner in FIG. 14, they may be arranged in a staggered row (alternately). Thus, if they are arranged in the staggered row, it is possible to improve an arrangement density of the lens 2 and the fiber 3. In addition, preliminary heating can be easily carried out with respect to the projecting part 4 (or 6) of the rear surface 1b of the lens array substrate 1.

As a matter of course, the present invention is not limited to the above-described embodiment and various modifications will become possible without departing from the scope of the present invention.

As described above in detail, according to the present invention, it is possible to compose the compact collimator array with excellent strength which has very few variations in the output beam angle and in the beam diameter, very few variations of temperature, and small reflection return light, so that it is conceivable that the present invention is very advantageous in a filed of an optical communication.

What is claimed is:

1. A collimator array, comprising:
    a substrate having first and second faces;
    a plurality of lenses formed on the first face of the substrate; and
    a plurality of projecting parts corresponding, respectively, to the plurality of lenses, each projecting part being formed on a portion of the second face of the substrate corresponding to the respective lens that corresponds to the projecting part, wherein
        the plurality of projecting parts are fusion-connected to a plurality of optical fibers, respectively, and
        an area of a fusion-connected face of each projecting part is larger than a cross sectional area of the respective optical fiber to which the projecting part is fusion-connected.

2. The collimator array according to claim 1,
    wherein each projecting part is formed by forming a concave part around a part corresponding to the corresponding lens.

3. The collimator array according to claim 2,
    wherein a thickness of each projecting part is set so that the fusion-connected face of the projecting part is located on a focal position of the corresponding lens.

4. The collimator array according to claim 3, further comprising:
    a plurality of fiber protecting members for protecting the plurality of fibers, respectively, on the second face of the substrate.

5. The collimator array according to claim 2, further comprising:
    a plurality of fiber protecting members for protecting the plurality of fibers, respectively, on the second face of the substrate.

6. The collimator array according to claim 1,
    wherein a thickness of each projecting part is set so that the fusion-connected face of the projecting part is located on a focal position of the corresponding lens.

7. The collimator array according to claim 6, further comprising:
    a plurality of fiber protecting members for protecting the plurality of fibers, respectively, on the second face of the substrate.

8. The collimator array according to claim 1, further comprising:
    a plurality of fiber protecting members for protecting the plurality of fibers, respectively, on the second face of the substrate.

9. The collimator array according to claim 1,
    wherein the substrate, the lenses, and the projecting parts are made of quartz, respectively.

10. The collimator array according to claim 8,
    wherein the fiber protecting members are made of quartz.

11. The collimator array according to claim 1, further comprising:
    an antireflection coating applied at least on the lenses.

12. The collimator array according to claim 1, further comprising:
    means for shielding unnecessary light provided on a portion other than the lenses on the first face of the substrate.

13. The collimator array according to claim 1,
    wherein each of the lenses and each of the optical fibers are arranged on the substrate one-dimensionally.

14. The collimator array according to claim 1,
    wherein each of the lenses and each of the optical fibers are arranged on the substrate two-dimensionally.

15. The collimator array according to claim 14,
    wherein each of the lenses and each of the optical fibers are arranged on the substrate in a staggered row.

16. A method of manufacturing a collimator array, comprising:
    forming a plurality of lenses on a first face of a substrate;
    forming a plurality of projecting parts corresponding, respectively, to the plurality of lenses, on a second face of the substrate;
    fusion-connecting a plurality of optical fibers to the plurality of projecting parts, respectively,
    wherein a cross-sectional area of a fusion-connected face of each projecting part is larger than a cross-sectional area of the respective optical fiber to which the projecting part is fusion-connected.

17. The method of manufacturing a collimator array according to claim 16, further comprising, for each projecting part:
    performing said fusion-connecting after preliminarily heating the projecting part.

18. The method of manufacturing a collimator array according to claim 17, further comprising:
    adjusting a thickness of each projecting part by polishing the projecting part before fusion-connecting the respective optical fiber so that the fusion-connected face of the projection part is located on a focal position of the corresponding lens.

19. The method of manufacturing a collimator array according to claim 16, further comprising:
    adjusting a thickness of each projecting part by polishing the projecting part before fusion-connecting the respective optical fiber so that the fusion-connected face of the projection part is located on a focal position of the corresponding lens.

20. A collimator array comprising:
    a substrate having first and second faces on opposite sides of the substrate;
    a plurality of lenses formed on the first face of the substrate;
    a plurality of projecting parts corresponding, respectively, to the plurality of lenses, and formed on the second face of the substrate; and
    a plurality of optical fibers fusion-connected to the plurality of projecting parts, respectively, wherein an area of a fusion-connected face of each projecting part is larger than a cross sectional area of the respective optical fiber to which the projecting part is fusion-connected.

21. A collimator array as in claim 20, wherein the fusion-connected face of each projecting part is located on a focal position of the corresponding lens.

22. A collimator array as in claim 20, wherein the substrate, the plurality of lenses and the plurality of projecting parts are made of quartz.

* * * * *